(12) United States Patent
Lin

(10) Patent No.: US 9,864,141 B1
(45) Date of Patent: Jan. 9, 2018

(54) SILICON-WAVEGUIDE-BASED BROADBAND POLARIZATION BEAM ROTATOR

(71) Applicant: INPHI CORPORATION, Santa Clara, CA (US)

(72) Inventor: Jie Lin, Santa Clara, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

(21) Appl. No.: 15/374,472

(22) Filed: Dec. 9, 2016

(51) Int. Cl.
*G02B 6/27* (2006.01)
*G02B 6/122* (2006.01)
*G02B 6/126* (2006.01)
*G02B 6/12* (2006.01)

(52) U.S. Cl.
CPC ......... *G02B 6/2766* (2013.01); *G02B 6/1228* (2013.01); *G02B 6/2726* (2013.01); *G02B 6/126* (2013.01); *G02B 2006/1215* (2013.01); *G02B 2006/12061* (2013.01); *G02B 2006/12152* (2013.01)

(58) Field of Classification Search
None
See application file for complete search history.

(56) References Cited

U.S. PATENT DOCUMENTS 5,285,507 A * 2/1994 Van der Tol ............ G02F 1/225
385/11
8,855,449 B1 * 10/2014 Roth ..................... G02B 6/2773
385/11
2013/0156361 A1 * 6/2013 Kojima .................... G02B 6/14
385/11
2014/0126855 A1 * 5/2014 Onishi .................. G02F 1/0136
385/3

(Continued)

FOREIGN PATENT DOCUMENTS

CA 2941552 A1 * 9/2015

OTHER PUBLICATIONS

J. Wang et al. Proposal for fabrication-tolerant SOI polarization splitter-rotator based on cascaded MMI couplers and an assisted bi-level taper. Optics Express, 22:23:27869-27879, Nov. 3, 2014.*

(Continued)

*Primary Examiner* — Mike Stahl
(74) *Attorney, Agent, or Firm* — Richard T. Ogawa; Ogawa P.C.

(57) ABSTRACT

A compact polarization beam rotator includes a converter waveguide comprising a first segment and a second segment both in corresponding taper rib shapes sharing a first middle plane and configured to receive an input optical signal with TM polarization mode from an input plane and convert the TM polarization mode to TE1 polarization mode comprising a first arm mode and a second arm mode at a second middle plane. The polarization beam rotator additionally includes a splitter waveguide coupled to the second middle plane for separating the first arm mode and the second arm mode at a third plane respectively coupled to a first branch waveguide to deliver the first arm mode in phase and a second branch waveguide to reverse the second arm mode phase by 180°, and a 2×1 MMI coupler waveguide to combine both arm modes in phase to an output optical signal with TE polarization mode.

17 Claims, 6 Drawing Sheets

(56) References Cited

U.S. PATENT DOCUMENTS

| | | | |
|---|---|---|---|
| 2015/0104128 A1* | 4/2015 | Oka .................... | G02B 6/1228 |
| | | | 385/3 |
| 2016/0246005 A1* | 8/2016 | Liu ..................... | G01J 3/0218 |
| 2017/0068048 A1* | 3/2017 | Kamei .................. | G02B 6/126 |
| 2017/0075063 A1* | 3/2017 | Brouckaert ............ | G02B 6/126 |

OTHER PUBLICATIONS

Y. Ding et al. Wideband polarization splitter and rotator with large fabrication tolerance and simple fabrication process. Optics Letters, 38:8:1227-1229, Apr. 15, 2013.*

* cited by examiner

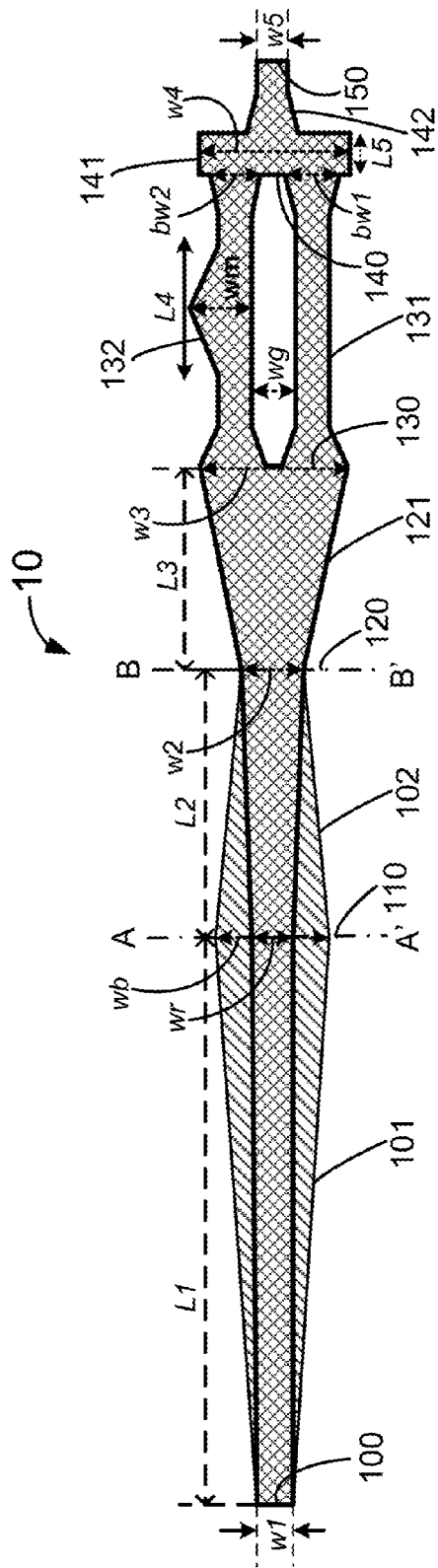
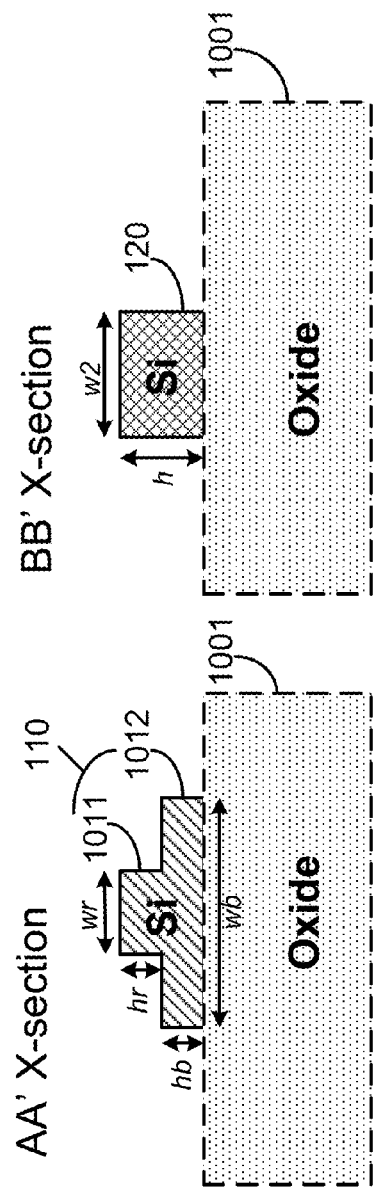
FIG. 1A
FIG. 1B
FIG. 1C

US 9,864,141 B1

SILICON-WAVEGUIDE-BASED BROADBAND POLARIZATION BEAM ROTATOR

BACKGROUND OF THE INVENTION

The present invention relates to a broadband communication device. More particularly, the present invention provides a Si-waveguide-based broadband polarization beam rotator with low loss and high extinction ratio for polarization-independent silicon photonics communication systems.

Over the last few decades, the use of broadband communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

Silicon photonics has become very popular for these applications because of the potential to combine high performance with low-cost fabrication. In addition, polarization multiplexing is another attractive, low-cost, and simple way to increase transmission capacity. Polarization beam rotator is a key element for polarization management in next generation polarization-independent silicon photonics circuits. A polarization beam rotator preferred for photonic integrated circuits (PICs) should simultaneously have features like compact size, high extinction ratio, low insertion loss, broadband range, stability, simple structure and high tolerances in manufacture. Conventional polarization beam rotator is either wavelength sensitive (not suit for broadband operation) or based on prism (hard to be made in super compact size). Most recent development of ultra-compact polarization beam rotator is relied on polarization diversity utilizing the large birefringence ($\sim 10^{-1}$) of silicon-on-insulator (SOI) nanowire-like waveguide. However, these designs mostly are based on asymmetric waveguides, directional coupler, and slot waveguides, which are all very tolerance sensitive, requiring certain critical dimensions (width or gap) of the waveguides to be smaller than 0.1 µm, and not realistic for process control and will result in very low yield in large scale manufacture. The symmetrical directional coupler is sensitive to fabrication variation. The asymmetrical directional coupler is even more sensitive on the dimension control than symmetrical directional coupler.

Therefore, it is desired to develop improved compact polarization beam rotator that is highly tolerable to waveguide dimension or overlay mismatch, wavelength insensitive, for example across entire C-band window, and temperature insensitive for the integrated silicon photonics circuits.

BRIEF SUMMARY OF THE INVENTION

The present invention relates to photonic broadband communication device. More particularly, the present invention provides a broadband polarization beam rotator. Merely by example, the present invention discloses a compact polarization beam rotator with two-segment taper/rib converter waveguide formed by silicon on SOI substrate to covert optical signal with Transverse Magnetic (TM) polarization mode to at least the lowest-order Transverse Electric (TE1) polarization mode having two arm modes. The compact polarization beam rotator further includes a splitter waveguide, a pair of branch waveguides, and a 2×1 MMI coupler waveguide to combine the two arm modes to one TE mode. The compact polarization beam rotator can be integrated in Si photonics circuits for broadband, e.g., entire C-band, polarization-independent communication system, though other applications in other wavelength and are possible.

In modern electrical interconnect systems, high-speed serial links have replaced parallel data buses, and serial link speed is rapidly increasing due to the evolution of CMOS technology. Internet bandwidth doubles almost every two years following Moore's Law. But Moore's Law is coming to an end in the next decade. Standard CMOS silicon transistors will stop scaling around 5 nm. And the internet bandwidth increasing due to process scaling will plateau. But Internet and mobile applications continuously demand a huge amount of bandwidth for transferring photo, video, music, and other multimedia files. This disclosure describes techniques and methods to improve the communication bandwidth beyond Moore's law.

In an embodiment, the present invention provides a polarization beam rotator for broadband operation. The polarization beam rotator includes a converter waveguide comprising a first segment and a second segment both in corresponding taper rib shapes sharing a first middle cross-section plane. The first segment is configured to receive an input optical signal with Transverse Magnetic (TM) polarization mode from an input plane and the second segment ends with a second middle cross-section plane. The converter waveguide converts the TM polarization mode to a first order Transverse Electric (TE1) polarization mode comprising a first arm mode in-phase and a second arm mode out-of-phase at the second middle cross-section. Additionally, the polarization beam rotator includes a splitter waveguide in taper shape coupled to the second middle cross-section plane for separating the first arm mode and the second arm mode at a third middle cross-section plane with a spacing greater than 0.2 µm. Furthermore, the polarization beam rotator includes a first branch waveguide and a second branch waveguide coupled to the third middle cross-section plane for respectively transmitting the first arm mode and the second arm mode. The first branch waveguide is configured to deliver the first arm mode with a same phase. The second branch waveguide comprises a phase shifter to deliver the second arm mode with a phase 180° reversed. Moreover, the polarization beam rotator includes a 2×1 Multimode Interference (MMI) coupler waveguide coupled to the first branch waveguide and the second branch waveguide to combine both the first arm mode and the second arm mode in phase to an output optical signal with TE polarization mode.

In an alternative embodiment, the present invention provides a broadband polarization-division multiplexer comprising one or more polarization beam rotators. Each polarization beam rotator includes a converter waveguide comprising a first segment and a second segment both in corresponding taper rib shapes sharing a first middle cross-section plane. The first segment is configured to receive an input optical signal with TM polarization mode from an input plane and the second segment ends with a second middle cross-section plane. The converter waveguide converts the TM polarization mode to a first order TE1 polarization mode comprising a first arm mode in-phase and a second arm mode out-of-phase at the second middle cross-section plane. The polarization beam rotator further includes a splitter waveguide in taper shape coupled to the second middle cross-section plane for separating the first arm mode and the second arm mode at a third middle cross-section plane with a spacing greater than 0.2 µm. Additionally, the polarization beam rotator includes a first branch waveguide and a second branch waveguide coupled to the third middle cross-section plane for respectively transmitting the first arm mode and the second arm mode. The first branch waveguide is configured to deliver the first arm mode with a same phase. The second branch waveguide includes a phase shifter to deliver the second arm mode with a phase 180° reversed. Furthermore, the polarization beam rotator includes a 2×1 MMI coupler waveguide coupled to the first branch waveguide and the second branch waveguide to combine both the first arm mode and the second arm mode in phase to an output optical signal with TE polarization mode. Through the polarization beam rotator, the output optical signal with TE polarization mode only suffers a power loss less than 1 dB relative to the input optical signal with TM polarization mode.

In another alternative embodiment, the present invention provides a polarization-independent silicon photonics communication system comprising one or more polarization beam rotators. Each of the one or more polarization beam rotators includes a converter waveguide comprising a first segment and a second segment both in corresponding taper rib shapes sharing a first middle cross-section plane. The first segment is configured to receive an input optical signal with TM polarization mode from an input plane and the second segment ends with a second middle cross-section plane. The converter waveguide converts the TM polarization mode to the first order TE1 polarization mode comprising a first arm mode in-phase and a second arm mode out-of-phase at the second middle cross-section plane. The polarization beam rotator further includes a splitter waveguide in taper shape coupled to the second middle cross-section plane for separating the first arm mode and the second arm mode at a third middle cross-section plane with a spacing greater than 0.2 µm. Additionally, the polarization beam rotator includes a first branch waveguide and a second branch waveguide coupled to the third middle cross-section plane for respectively transmitting the first arm mode and the second arm mode. The first branch waveguide is configured to deliver the first arm mode with a same phase. The second branch waveguide includes a phase shifter to deliver the second arm mode with a phase 180° reversed. Furthermore, the polarization beam rotator includes a 2×1 MMI coupler waveguide coupled to the first branch waveguide and the second branch waveguide to combine both the first arm mode and the second arm mode in phase to an output optical signal with TE polarization mode. Through the polarization beam rotator, the output optical signal with TE polarization mode only suffers a power loss less than 1 dB relative to the input optical signal with TM polarization mode. The polarization beam rotator can be used in reversed direction for converting a TE mode signal to a TM mode signal, making the silicon photonics system capable of transmitting and receiving polarized optical signals in either direction of communication.

Many benefits of polarization-independent Si photonics systems can be achieved with the compact polarization beam rotator provided in the present invention. The polarization beam rotator is a key element for polarization management in next-generation Si photonics systems. The polarization beam rotator in the current disclosure is compact in size, simple structure for convenient manufacture process, and highly tolerant for process conducted on silicon-on-insulator (SOI) substrate, which are all crucial factors for integration of photonics systems. The polarization beam rotator in the current disclosure is characterized by a robust Si-waveguide design with less than 1 dB loss over entire C-band which is desired for the Si photonics systems. Same design principle should be also applied to form a broadband polarization beam rotator operated for O-band.

The present invention achieves these benefits and others in the context of known polarization beam splitting technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

FIG. 1A is a top-view diagram of a waveguide-based polarization beam rotator according to an embodiment of the present invention.

FIG. 1B is a cross-section view along AA' plane of the waveguide-based polarization beam rotator of FIG. 1A according to an embodiment of the present invention.

FIG. 1C is a cross-section view along BB' plane of the waveguide-based polarization beam rotator according to an embodiment of the present invention.

DETAILED DESCRIPTION OF THE INVENTION

Figure 2:
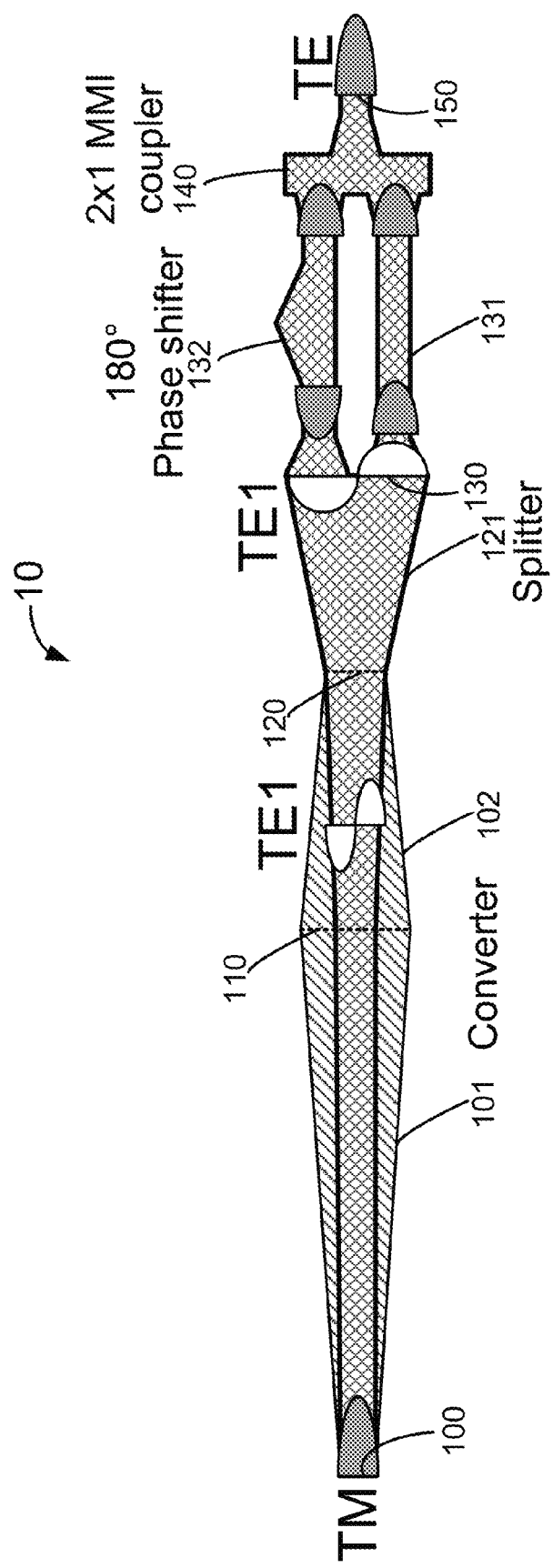
FIG. 2 is a schematic diagram showing functions of the polarization beam rotator according to an embodiment of the present invention.

The present invention relates to a broadband communication device. More particularly, the present invention provides a Si-waveguide-based broadband polarization beam rotator with low loss and high extinction ratio for polarization-independent silicon photonics communication systems, though other applications are possible.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

FIG. 1A is a top-view diagram of a waveguide-based polarization beam rotator according to an embodiment of the present invention. This diagram is merely an example, which should not unduly limit the scope of the claims. One of ordinary skill in the art would recognize many variations, alternatives, and modifications. Referring to FIG. 1A a top view of waveguide-based polarization beam rotator 10 is shown. In some embodiments, the polarization beam rotator 10 comprises a monolithically patterned silicon waveguide formed on a silicon-on-insulator (SOI) substrate. In a specific embodiment, a standard platform of the SOI substrate comprises a 220 nm Si layer over an oxide layer, as shown as FIG. 1C in cross-sectional view. The polarization beam rotator 10 includes a converter waveguide in taper rib shape including a first segment 101 of a length L1 laid between an input plane 100 and a first middle cross-section plane 110. The converter waveguide in taper rib shape further includes a second segment 102 of a length L2 coupled to (or naturally extended from) the first middle cross-section plane 110 and ended at a second cross-section plane 120. The taper shape of the first segment 101 is characterized by increasing widths along the length L1 from a width w1 at the input plane to a bigger width wb at the first middle cross-section plane 110. The taper shape of the second segment 102 is characterized by decreasing widths along the length L2 from the width wb at the first middle cross-section plane 110 to a smaller width w2 at the second middle cross-section plane 120.

Both the first segment 101 and the second segment 102 are also in rib shape, e.g., except for the input plane 100 with a single-layer structure of a width w1 and the second middle cross-section plane 120 with another single-layer structure of a width w2, a double-layer structure formed between the plane 100 and the plane 120 including a smaller width rib layer over a wider base layer as seen in FIG. 1B for the AA' plane at the first middle cross-section plane 110. In some embodiments, both the first segment 101 and the second segment 102 are made by patterning a silicon layer of a uniform thickness h in taper shape utilizing the standard Si layer over the oxide layer of an SOI substrate, referring to the as-mentioned single-layer structure 100 or 120, as seen in FIG. 1C. Further, the first segment 101 and the second segment 102 are patterned to form a rib shape on top of the taper shape by removing part of the single layer of silicon to form a double-layer structure, e.g., a rib layer of thickness hr over a base layer of thickness hb, as seen in FIG. 1B, limited substantially by hr+hb=h. The rib layer also has a taper shape. The rib layer has an increasing width along the length L1 of the first segment 101 from w1 at the input plane 100 to wr at the first middle cross-section plane 110 and further an increasing width along the length L2 of the second segment 102 to w2 at the second middle cross-section plane 120.

In an embodiment, the converter waveguide formed in such a two-segment taper rib shape on SOI substrate provides a confined mechanical structure for effectively converting optical signal of a TM polarization mode received at the input plane to the first order TE1 mode beyond the first middle cross-section plane 110 up to the second middle cross-section plane 120. In a specific embodiment, by utilizing a standard 220 nm Si layer thickness of a SOI substrate, a compact converter waveguide for achieving the above purpose can be formed with the following dimensions for the first segment 101 and the second segment 102: length L1=43 μm, L2=20 μm; width w1=0.45 μm, wr=0.55 μm, wb=1.55 μm, and w2=0.85 μm. Each dimension here is associated with a common height h=220 nm (the Si layer thickness of the SOI substrate) and can be varied with at least 10% margin. Of course, other dimensions may be chosen for achieving similar conversion result of converting TM mode to TE1 mode but the above selection is preferred if the 220 nm standard SOI substrate is used. As seen, the smallest one is w1 of 0.45 μm that is a standard process-reliable waveguide dimension. In other words, the polarization beam rotator 10 according to the current invention, at least for the converter waveguide part, does not have the issues of some conventional ones that need certain critical waveguide dimension as small as 100 nm to achieving their designated rotator function, making those conventional options not quite suitable for mass production due to poor manufacture yield.

Referring to FIG. 1A again, the polarization beam rotator 10 includes a splitter waveguide 121 coupled to (or naturally extended from) the second middle cross-section plane 120. The TE1 mode of the optical signal at the second middle cross-section plane 120 is characterized by two arm modes (or sub-modes) with intensities peaked at two spots with a small separation and opposite in phase thereof, i.e., a first arm mode being in-phase and a second arm mode being out-of-phase relative to the input TM mode. The splitter waveguide 121 is also in a simple taper shape without rib having a length of L3 configured to split the two arm modes further with increasing width along the length L3 from w2 at the second middle cross-section plane 120 ended with w3 at a third middle cross-section plane 130. Again, in a specific embodiment, this splitter waveguide 121 is also formed from the standard 220 nm SOI substrate so that it has a same thickness of 220 nm as the converter waveguide. Accordingly, the L3 is about 15 μm or greater, the width w3 is about 2 μm or greater so that the first arm mode can be sufficiently separated from the second arm mode. Of course, the longer the splitter waveguide 121 and the wider the width w3, the wider separation can be for the two arm modes. Yet, a design rule is to keep the structure as compact as possible yet achieving a spacing large enough for separately coupling the two arm modes into two branch waveguides having their separation larger than minimum tolerant spacing by waveguide-process so that its mass production can be done with high yield. The suggested values for L3 and w3 above are merely an example and can be varied with at least 10% margin.

Referring to FIG. 1A again, the polarization beam rotator 10 includes a first branch waveguide 131 and a second branch waveguide 132 laid substantially in parallel and respectively coupled to two separate portions of the third middle cross-section plane 130 for respectively guiding the first arm mode signal and the second arm mode signal splitted by the splitter waveguide 121. In particular, the first branch waveguide 131 includes a taper section coupled to a portion of the third middle cross-section plane 130 for receiving primarily the first arm mode signal and a straight section for guiding the signal forward substantially in phase with original TM mode signal at the input plane 100. The second branch waveguide 132 includes a taper section coupled to another portion of the third middle cross-section plane 130 for receiving primarily the second arm mode signal. The another portion for coupling the second arm mode signal is separated from the portion for coupling the first arm mode signal on the third middle cross-section plane 130. The second branch waveguide 132 further comprises a phase shifter with varied widths with a length L4 measured from a starting position (next to the taper section) of a first section with increasing widths up to a maximum value of wm at roughly a middle position to an end position of a second section with decreasing width.

In a specific embodiment, the length L4 is about 10 μm and the maximum width wm at the middle position of the length L4 is about 0.86 μm. Such a dimension setup for the phase shifter is able to substantially reverse the phase of the second arm mode signal by 180° over the length L4. Thus, the second branch waveguide 132 is able to guide the second arm mode, after a 180° phase reversal, also forward in-phase with original TM mode signal at the input plane 100 as well as the first arm mode signal through the first branch waveguide 131. The suggested values for L4 and wm above are merely an example and can be varied with at least 10% margin. Throughout their lengths both the first branch waveguide 131 and the second waveguide 132 are laid in parallel with a spacing wg set to be about 0.6 μm. This is still much larger than preferred minimum waveguide separation dimension of 200 nm for silicon waveguide on the SOI substrate so that it is very much feasible for mass production.

Referring to FIG. 1A, the polarization beam rotator 10 additionally includes a 2×1 multimode interference (MMI) coupler waveguide 140 for combining the first arm mode signal and the second arm mode signal. In particular, the 2×1 MMI coupler waveguide 140 includes a rectangular section 141 of a width of 2 μm coupled to the first branch waveguide 131 and the second branch waveguide 132 via a pair of taper sections taking part of the width of 2 μm (each having a width bw1 or bw2 of 0.7~0.9 μm) with a separation larger than 0.2 μm. The 2×1 MMI coupler waveguide 140 comprises a taper shaped section 142 coupled to another side of the rectangular section 141 for guiding the combined signal to an output plane 150 with a width w5. Since the second arm (TE1) mode signal from the second branch waveguide 131 has been reversed 180° and becomes in phase with the first arm (TE1) mode signal from the first branch waveguide 132, the combined signal would be a full power TE mode signal at the output plane 150. In an embodiment, the width w5 of the output plane 150 of the polarization beam rotator 10 is set to be substantially the same as the width w1 of the input plane 100. In an example, w5=0.45 μm.

FIG. 1B is a cross-section view along AA' plane of the waveguide-based polarization beam rotator of FIG. 1A according to an embodiment of the present invention. FIG. 1C is a cross-section view along BB' plane of the waveguide-based polarization beam rotator according to an embodiment of the present invention. Just as an example, the AA' plane is the first middle cross-section plane 110 of the waveguide-based polarization beam rotator 10 having a rib structure. It shows a waveguide 101 having a rib structure 1011 formed overlying a base structure 1012 which is part of an original Si layer on an oxide layer 1001 of a SOI substrate. In another example, the BB' plane is the second middle cross-section plane 120 of the waveguide-based polarization beam rotator 10.

In an alternative embodiment, the present disclosure also provides a method for forming the Si-waveguide having taper rib structure on 220 nm Si layer of a standard SOI substrate. Particularly, the method includes patterning the 220 nm Si layer on an oxide layer of the SOI substrate to form a waveguide structure of a certain length with rectangular cross-section (as seen in FIG. 1C) having various widths and a common height of h that is equal to the Si layer thickness 220 nm. The width w of the waveguide structure may vary along its length to make the waveguide in taper shape. Then the method includes overlaying a rib pattern having various widths wr<w and a height of hr<h along the length of the previously patterned waveguide structure. This second patterning process removes partial Si material in the waveguide structure to form a rib structure over a base structure as seen in FIG. 1B. The base structure has a height of hb and a width of wb. The sum of the rib height hr and the base height hb equals to the original height h of previously patterned waveguide. The base structure keeps its width wb the same as original width w of the rectangular shaped waveguide.

In a specific embodiment, ideally the rib structure is preferred to be formed in the middle position along the length of the previously patterned rectangular waveguide, though overlay offset often occurs to cause a small shift of a central line of the rib structure away from a central line of the base structure. It will be noted below that the polarization beam rotator according to the present disclosure can substantially keeps its designed function of converting TM to TE mode or vice versa over broad wavelength range (such as entire C-band) with only less than 1 dB power loss even there is typical process overlay offset of the rib structure.

FIG. 2 is a schematic diagram showing functions of the polarization beam rotator according to an embodiment of the present invention. This diagram is merely an example, which should not unduly limit the scope of the claims. One of ordinary skill in the art would recognize many variations, alternatives, and modifications. As shown, the polarization beam rotator 10 (of FIG. 1A) is configured to receive an optical signal with TM polarization mode at the input plane 100. A converter waveguide having two segments of taper rib structure is designed to convert the TM mode to the first order TE mode, i.e., TE1 mode. The first segment 101 has a taper rib shape with increasing base width and increasing rib width along the length from the input plane 100, where the base width and the rib width are equal, to a first middle cross-section plane 110. This structure allows the TM mode coupled inside the first segment starts to gradually change its optical intensity mode pattern along the length. The second segment 102 also has a taper rib shape with increasing rib width but with decreasing base width along the length from the first middle cross-section plane 110 to the second middle cross-section plane 120, where the base width and the rib width are equal again. Beyond the first middle cross-section plane 110 up to the second middle cross-section plane 120, the TM mode is substantially changed toward TE1 mode and shows two distinctly separate intensity peaks one with a TE1 sub-mode being in-phase and another TE1 sub-mode being out-of-phase relative to original TM mode.

Referring to FIG. 2 again, the polarization beam rotator 10 includes a splitter waveguide 121 for further splitting the two intensity peaks farther apart up to the third middle cross-section plane 130. Again the two TE1 sub-modes remain one in-phase and another one out-of-phase but with lower peak intensity and wider separation.

Now, two branch waveguides 131 and 132 are used to respectively couple the two TE1 sub-mode signals at a third middle cross-section plane 130 of the splitter waveguide 121. The two branch waveguides 131 and 132 are substantially in parallel in layout and have a separation larger than 0.2 µm. The first branch waveguide 131 couples one TE1 sub-mode in-phase and keeps guiding it through the same phase up to an end plane thereof. The second branch waveguide 132 is configured with varying widths as a phase shifter and couples another TE1 sub-mode out-of-phase and reverse its phase by 180° to turn it also a TE1 sub-mode in-phase at an end plane thereof, which is at least 0.2 µm apart from the end plane of the first branch waveguide 131.

The polarization beam rotator 10 includes a 2×1 MMI coupler waveguide 140 to couple to both end planes of the first branch waveguide 131 and the second branch waveguide 132 for combining the two TE1 sub-mode signals, both being in-phase now, to one single TE mode signal at an output plane 150. The output plane 150 has a rectangular shape with a width substantially equal to the width of the input plane 100. The optical power of the TE mode signal only loses less than 1 dB over the entire length of monolithic shaped waveguide of the polarization beam rotator 10. In a specific embodiment, the above polarization rotating function can be realized for all polarized optical signals of with wavelengths in entire C-band. Optionally, the same design principle and associated function can be applied to a broadband polarization beam rotator operated for entire O-band.

Figure 3:
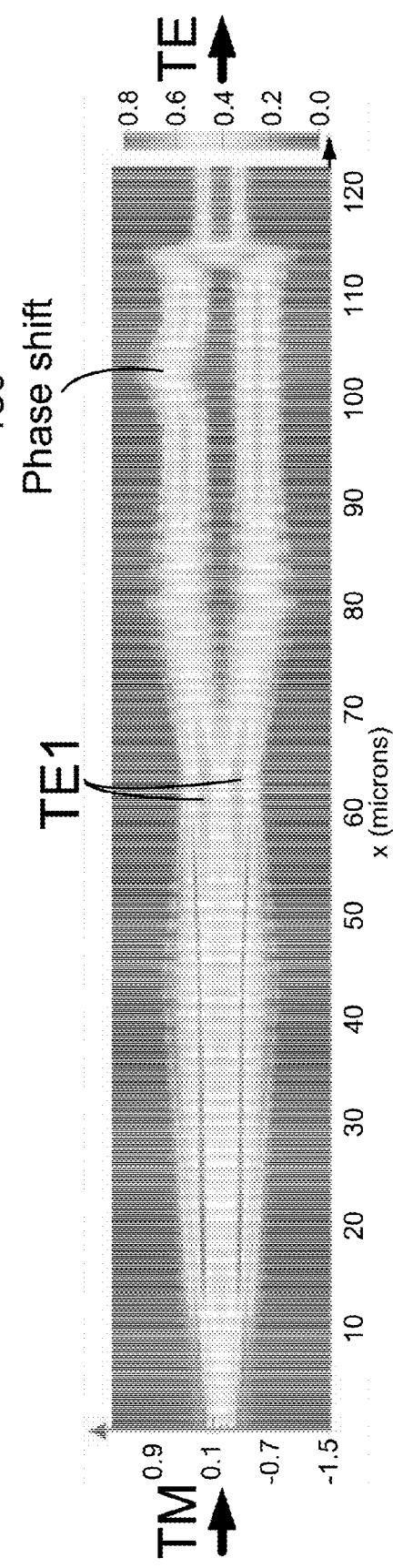
FIGS. 3A and 3B are an exemplary diagram showing (A) intensity distributions of an input TM mode signal passing forward through the polarization beam rotator to an output as a TE mode signal and (B) reversely an input TE mode signal passing backward through the polarization beam rotator to an output TM mode signal according to an embodiment of the present invention.

FIGS. 3A and 3B are an exemplary diagram showing (A) intensity distributions of an input TM mode signal passing forward through the polarization beam rotator to an output as a TE mode signal and (B) reversely an input TE mode signal passing backward through the polarization beam rotator to an output TM mode signal according to an embodiment of the present invention. This diagram is merely an example, which should not unduly limit the scope of the claims. One of ordinary skill in the art would recognize many variations, alternatives, and modifications. In part (A) of FIG. 3, it shows that an optical signal received at the input plane (at left end of the figure) has a peak intensity in TM mode substantially distributed near a center, which is guided forward along a central line of the waveguide-based polarization beam rotator (i.e., the polarization beam rotator 10 of FIG. 1A). Down to the optical path, the single TM mode is gradually converted to two sub-modes of TE1 characteristics having a small gap between each other at about a middle cross-section plane of the polarization beam rotator. Further down the path, the two TE1 sub-modes are split farther apart as a first arm mode, being in-phase with original TM mode signal, coupled into a first branch waveguide and a second arm mode, being out-of-phase with the original TM mode signal, coupled into a second branch waveguide. Particularly, the first branch waveguide (located at lower position of the figure) simply guides the first arm mode in a same phase relative to the TM mode, but the second branch waveguide (located at upper position in the figure) is configured to reverse the phase of the second arm mode by 180° to turn the out-of-phase signal to an in-phase signal. Although the figure does not explicitly show the phase in each branch, it shows no intensity change through the first branch but does show intensity changes from high to low and high again along the second branch. Finally, the first arm mode and the second arm mode being commonly in-phase are combined via a 2×1 MMI coupler into a single TE mode at an output plane (at the right end of the figure). Thus, passing through the polarization beam rotator of about 120 µm, the input optical signal with TM mode is converted to an output optical signal with TE mode.

In the part (B) of FIG. 3, it shows that the same polarization beam rotator is also functioned to convert a TE mode signal to a TM mode signal, when the TE mode signal is inputted from the output plane at the right end and guide in opposite direction toward left to output a TM mode at the input plane at the left end. The TE mode signal first is split to two parts, one through the first branch with the same phase and another one through the second branch with a reversed phase. Then they are merged to become two sub-modes of a TE1 mode signal. Further through a converter waveguide (backward) the TE1 mode signal is converted to the TM mode signal.

In some embodiments, the polarization beam rotator provided in this disclosure is not only compact in size and simple for manufacture based on waveguide design on standard silicon-on-insulator substrate with 220 nm Si layer, but also it has very good optical performance with less than 1 dB power loss over entire C-band when it is used on silicon photonics systems. The method disclosed in this invention for forming the waveguide-based polarization beam rotator provides a robust design that is very tolerant to the process variation.

Figure 4:
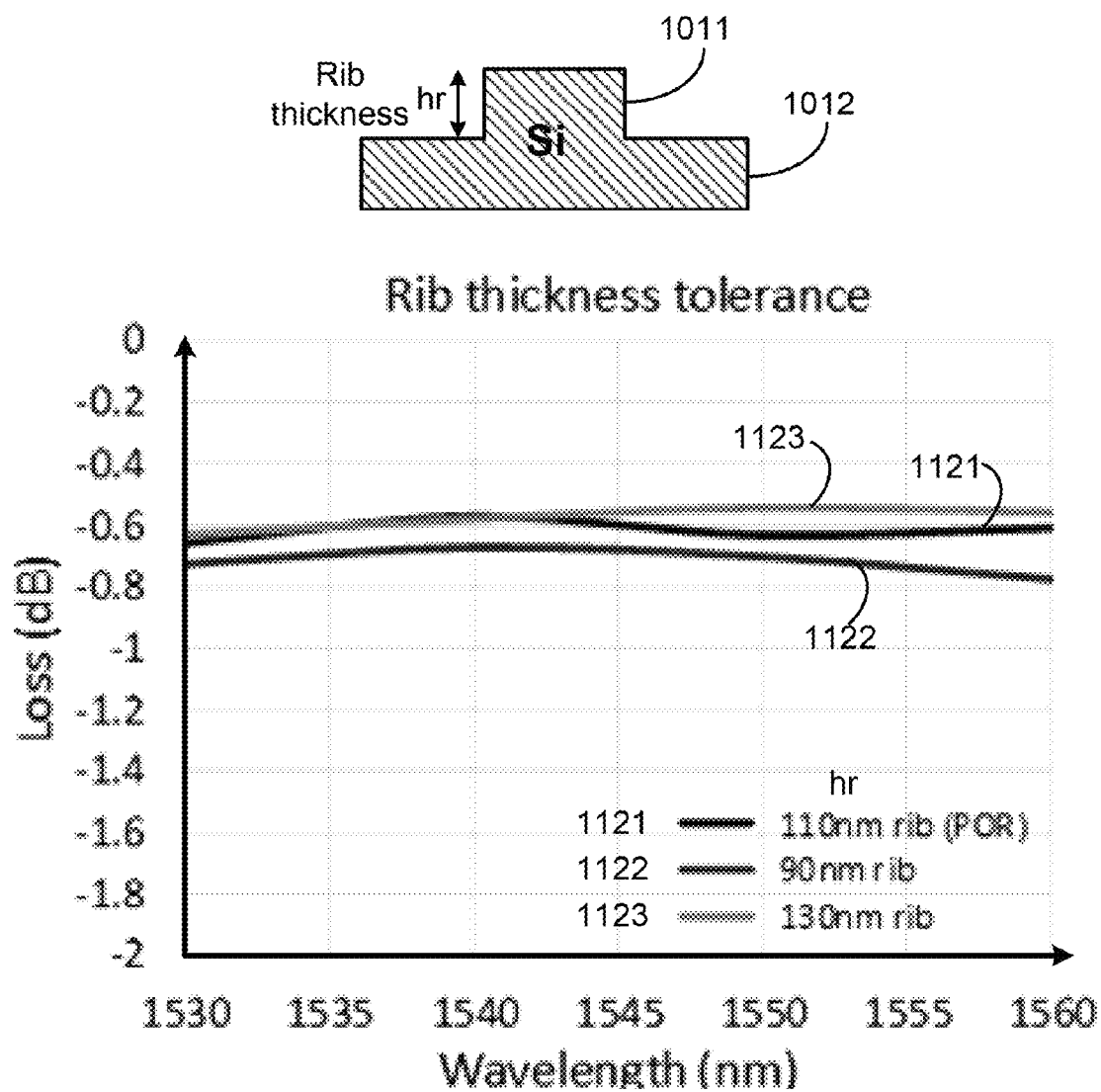
FIG. 4 is a plot of power loss versus C-band over various rib thicknesses of the polarization beam rotator according to an embodiment of the present invention.

FIG. 4 is a plot of power loss versus C-band over various rib thicknesses of the polarization beam rotator according to an embodiment of the present invention. As shown above, the polarization beam rotator includes a two-segment taper rib shaped converter waveguide. Forming the rib structure overlying a based structure in pre-fabricated rectangular shaped waveguide is a crucial step. Provided with a 220 nm Si layer of the standard SOI substrate, the overlay process is done on a pre-fabricated waveguide with 220 nm in thickness of a certain length to form a rib structure 1011 of a smaller thickness hr on a base structure 1012 with part of Si material being removed from each side of the rib 1011. Typical Si waveguide process variation may result in variation of the rib thickness which could affect the optical performance of the polarization beam rotator. As shown in FIG. 4, three samples of polarization beam rotator with different rib thicknesses, 90 nm, 110 nm, and 130 nm, formed using a same overlay patterning process are provided for characterizing their optical performances. All three samples are measured the optical power loss versus all wavelengths in entire C-band. Curve 1121 represents the data for polarization beam rotator with a rib thickness of 110 nm. Curve 1122 represents the data for polarization beam rotator with a rib thickness of 90 nm, having a maximum loss of about −0.8 dB across the C-band between 1530 nm to 1560 nm. Curve 1123 represents the data for polarization beam rotator having a rib thickness of 130 nm, having a minimum loss of about −0.6 dB across the C-band between 1530 nm to 1560 nm. In other words, the polarization beam rotator of the present invention is very robust with high performance in a broadband of wavelengths and highly tolerant to the variation of rib thickness.

Figure 5:
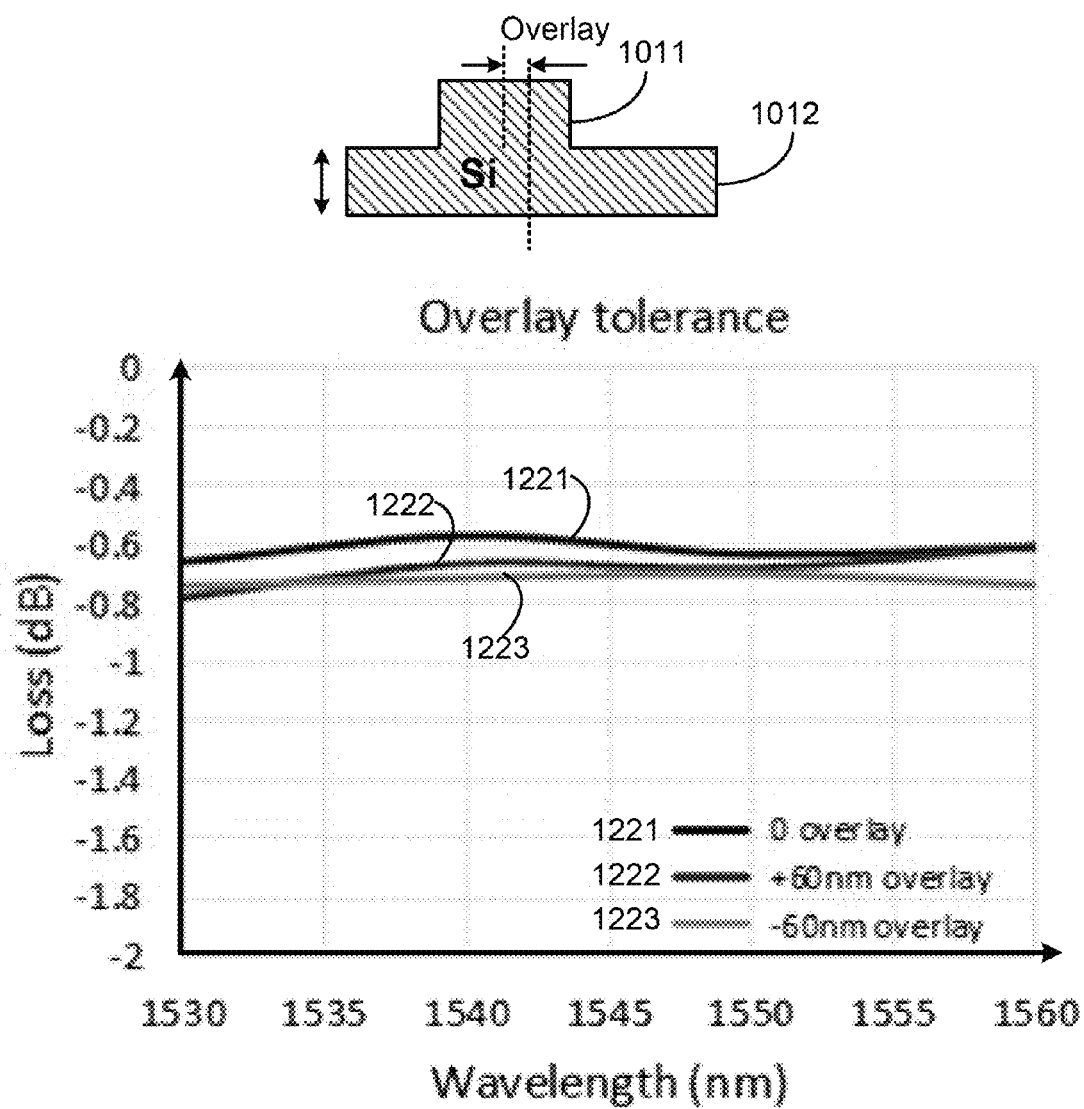
FIG. 5 is a plot of power loss versus C-band over various rib overlays of the polarization beam rotator according to an embodiment of the present invention.

FIG. 5 is a plot of power loss versus C-band over various rib overlays of the polarization beam rotator according to an embodiment of the present invention. The overlay patterning process also may result in offset of a position of the rib structure away from a central line of the base structure. FIG. 5 shows a rib structure formed with possible overlay variation. Again, three samples of polarization beam rotator with different overlays, 0, +60 nm, and −60 nm. All three samples are measured the optical power loss versus all wavelengths in entire C-band. Curve 1221 represents the data for polarization beam rotator with a 0 overlay, having a minimum loss of slightly smaller than −0.6 dB at a wavelength between 1530 nm to 1560 nm. Curve 1222 represents the data for polarization beam rotator with a +60 nm overlay, having a maximum loss of slightly over −0.8 dB at about 1530 nm. Curve 1223 represents the data for polarization beam rotator having a −60 nm overlay, having its loss around −0.7 dB across the C-band between 1530 nm to 1560 nm. The data shows that the polarization beam rotator of the present invention is very robust with high performance in a broadband of wavelengths and highly tolerant to the variation of rib overlay variation.

Figure 6:
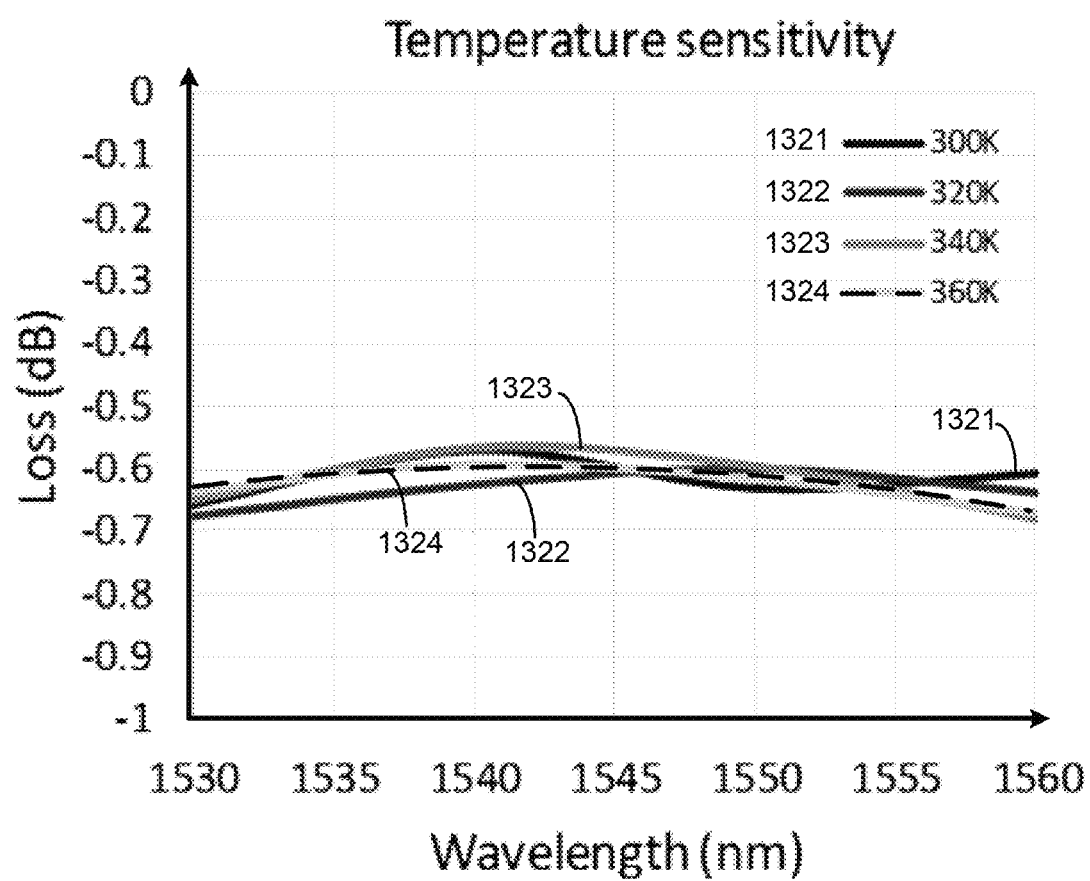
FIG. 6 is a plot of power loss versus C-band over various operation temperatures of the polarization beam rotator according to an embodiment of the present invention.

Additionally, the polarization beam rotator provided in this disclosure is proved with high optical performance in terms of being insensitive to temperature. FIG. 6 is a plot of power loss versus C-band over various operation temperatures of the polarization beam rotator according to an embodiment of the present invention. As shown, a sample of polarization beam rotator is measured its TM-to-TE signal conversion loss over entire C-band against wide temperature changes from 300K to 360K. Curve 1321 shows data for the polarization beam rotator operated at 300K, yielding a loss ranging from −0.57 dB to −0.66 dB. Curve 1322 shows data for the polarization beam rotator operated at 320K, yielding a narrower loss range between −0.59 dB and −0.65 dB. Curve 1323 shows data for the polarization beam rotator operated at 340K, yielding a loss ranging from −0.56 dB to −0.68 dB. Curve 1324 shows data for the polarization beam rotator operated at 360K, yielding a loss range between −0.6 dB to −0.67 dB. Therefore, it is proven that the polarization beam rotator is very insensitive to the temperature variation across entire C-band.

Accordingly, the present invention provides, inter alia, a waveguide-based polarization beam rotator, a polarization-independent device for integrating in polarization multiplexer/de-multiplexer, a polarization-independent silicon photonics communication system, and a method for making the polarization beam rotator using a SOI substrate that substantially obviate one or more of the problems due to limitations and disadvantages of the related art. In one aspect, the present invention provides a broadband polarization-division multiplexer comprising one or more polarization beam rotators. Each polarization beam rotator includes a converter waveguide comprising a first segment and a second segment both in corresponding taper rib shapes sharing a first middle cross-section plane. The first segment is configured to receive an input optical signal with TM polarization mode from an input plane and the second segment ends with a second middle cross-section plane. The converter waveguide converts the TM polarization mode to the first order TE1 polarization mode comprising a first arm mode in-phase and a second arm mode out-of-phase at the second middle cross-section plane. The polarization beam rotator further includes a splitter waveguide in taper shape coupled to the second middle cross-section plane for separating the first arm mode and the second arm mode at a third middle cross-section plane with a spacing greater than 0.2 µm. Additionally, the polarization beam rotator includes a first branch waveguide and a second branch waveguide coupled to the third middle cross-section plane for respectively transmitting the first arm mode and the second arm mode. The first branch waveguide is configured to deliver the first arm mode with a same phase. The second branch waveguide includes a phase shifter to deliver the second arm mode with a phase 180° reversed. Furthermore, the polarization beam rotator includes a 2×1 MMI coupler waveguide coupled to the first branch waveguide and the second branch waveguide to combine both the first arm mode and the second arm mode in phase to an output optical signal with TE polarization mode. Through the polarization beam rotator, the output optical signal with TE polarization mode only suffers a power loss less than 1 dB relative to the input optical signal with TM polarization mode. The polarization beam rotator can be used in reversed direction for converting a TE mode signal to a TM mode signal.

In another aspect, the present invention provides a polarization-independent silicon photonics communication system comprising one or more polarization beam rotators. Each of the one or more polarization beam rotators includes a converter waveguide comprising a first segment and a second segment both in corresponding taper rib shapes sharing a first middle cross-section plane. The first segment is configured to receive an input optical signal with TM polarization mode from an input plane and the second segment ends with a second middle cross-section plane. The converter waveguide converts the TM polarization mode to at least a lowest-order TE1 polarization mode comprising a first arm mode in-phase and a second arm mode out-of-phase at the second middle cross-section plane. The polarization beam rotator further includes a splitter waveguide in taper shape coupled to the second middle cross-section plane for separating the first arm mode and the second arm mode at a third middle cross-section plane with a spacing greater than 0.2 µm. Additionally, the polarization beam rotator includes a first branch waveguide and a second branch waveguide coupled to the third middle cross-section plane for respectively transmitting the first arm mode and the second arm mode. The first branch waveguide is configured to deliver the first arm mode with a same phase. The second branch waveguide includes a phase shifter to deliver the second arm mode with a phase 180° reversed. Furthermore, the polarization beam rotator includes a 2×1 MMI coupler waveguide coupled to the first branch waveguide and the second branch waveguide to combine both the first arm mode and the second arm mode in phase to an output optical signal with TE polarization mode. Through the polarization beam rotator, the output optical signal with TE polarization mode only suffers a power loss less than 1 dB relative to the input optical signal with TM polarization mode. The polarization beam rotator can be used in reversed direction for converting a TE mode signal to a TM mode signal, making the silicon photonics system capable of transmitting and receiving polarized optical signals in either direction of communication.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A polarization beam rotator for broadband operation comprising:

a converter waveguide comprising a first segment and a second segment both in corresponding taper rib shapes sharing a first middle cross-section plane, the first segment being configured to receive an input optical signal with Transverse Magnetic (TM) polarization mode from an input plane and the second segment ending with a second middle cross-section plane, the converter waveguide converting the TM polarization mode to the first order Transverse Electric (TE1) polarization mode comprising a first arm mode in-phase and a second arm mode out-of-phase at the second middle cross-section;

a splitter waveguide in taper shape coupled to the second middle cross-section plane for separating the first arm mode and the second arm mode at a third middle cross-section plane with a spacing greater than 0.2 μm;

a first branch waveguide and a second branch waveguide coupled to the third middle cross-section plane for respectively transmitting the first arm mode and the second arm mode, the first branch waveguide being configured to deliver the first arm mode with a same phase, the second branch waveguide comprising a phase shifter to deliver the second arm mode with a phase 180° reversed; and a 2×1 Multimode Interference (MMI) coupler waveguide coupled to the first branch waveguide and the second branch waveguide to combine both the first arm mode and the second arm mode in phase to an output optical signal with TE polarization mode;

wherein the output optical signal comprises a power loss less than 1 dB relative to the input optical signal with any wavelength in entire C-band.

2. The polarization beam rotator of claim 1, wherein each of the converter waveguide, splitter waveguide, first branch waveguide, second branch waveguide, and 2×1 MMI coupler waveguide comprises a monolithic body of silicon material formed on a silicon-on-insulator (SOI) substrate.

3. The polarization beam rotator of claim 2, wherein the SOI substrate comprises a 220 nm Si layer on SOI platform that applies to a maximum thickness for each of the converter waveguide, splitter waveguide, first branch waveguide, second branch waveguide, and 2×1 MMI coupler waveguide.

4. The polarization beam rotator of claim 3, wherein the first segment comprises an input waveguide having a first rib on a first base both in taper shapes with a first length between the input plane of a first width and the first middle cross-section plane having a first middle-base width and a first middle-rib width, wherein the first middle-base width is greater than the first width, the first middle-rib width is greater than the first width and is smaller than the first middle-base width, and a sum of thicknesses of the first rib and the first base equals to total thickness of the 220 nm Si layer.

5. The polarization beam rotator of claim 4, wherein the second segment comprises a second rib on a second base both having a taper shape in a second length between the first middle cross-section plane and the second middle cross-section plane having a second width, wherein the second width is greater than the first middle-rib width and smaller than the first middle-base width, and a sum of thicknesses of the second rib and the second base equals to total thickness of the 220 nm Si layer.

6. The polarization beam rotator of claim 5, wherein the first length is 43 μm, the first width is 0.45 μm, the first middle-rib width is 0.55 μm, the first middle-base width is 1.55 μm, the second length is 20 μm, and the second width is 0.85 μm for converting TM mode at the input plane to TE1 mode at the second middle cross-section plane, wherein each width or length comprises 10% margin of flexibility.

7. The polarization beam rotator of claim 1, wherein the splitter waveguide in taper shape comprises a third length between the second cross-section plane to a third cross-section plane having a third width, wherein the third width is greater than the second width and is sufficiently wide to define a first portion and a second portion with a separation greater than 0.2 μm, the first portion being configured to be coupled with the first branch waveguide and the second portion being configured to be coupled with the second branch waveguide.

8. The polarization beam rotator of claim 7, wherein the third length is 15 μm with 10% margin of flexibility.

9. The polarization beam rotator of claim 1, wherein the input optical signal comprises any wavelength in entire C-band.

10. The polarization beam rotator of claim 1, wherein the output optical signal comprises a power loss variation less than 0.2 dB relative to the input optical signal with any wavelength across entire C-band for operations with a temperature variation from 300 K to 360 K.

11. The polarization beam rotator of claim 5, wherein the output optical signal comprises a power loss variation less than 0.2 dB relative to the input optical signal with any wavelength across entire C-band for ±20 nm thickness variations for forming either the first rib or the second rib.

12. The polarization beam rotator of claim 5, wherein the output optical signal comprises a power loss variation less than 0.2 dB relative to the input optical signal with any wavelength across entire C-band for ±60 nm overlay variations for forming either the first rib or the second rib.

13. The polarization beam rotator of claim 1, wherein the phase shifter comprises a waveguide of a length of about 10 μm and increasing widths in a first half of the length up to a maximum of about 0.86 μm at a middle position followed by a second half of the length with decreasing widths.

14. The polarization beam rotator of claim 1, wherein the 2×1 MMI coupler waveguide comprises a rectangular segment sharing a fourth middle cross-section plane with the first branch waveguide and the second branch waveguide, the fourth middle cross-section plane having a width of about 2 μm with each of first branch waveguide and the second branch waveguide occupying a portion less than 0.9 μm with a separation greater than 0.2 μm.

15. The polarization beam rotator of claim 14, wherein the rectangular segment has a length of about 3.25 μm coupled to a taper segment ended at an output plane having a second width substantially equal to the first width.

16. The polarization beam rotator of claim 15, wherein the output plane is configured to receive a second input optical signal with TE polarization mode thereby outputting a second output optical signal with TM polarization mode at the input plane of the first segment of the converter waveguide, wherein the second output optical signal comprises a power loss less than 1 dB relative to the second input optical signal with any wavelength in entire C-band.

17. A broadband polarization-division multiplexer comprising one or more polarization beam rotators, each polarization beam rotator comprising:

a converter waveguide comprising a first segment and a second segment both in corresponding taper rib shapes sharing a first middle cross-section plane, the first segment being configured to receive an input optical signal with Transverse Magnetic (TM) polarization mode from an input plane and the second segment ending with a second middle cross-section plane, the converter waveguide converting the TM polarization mode to the first order Transverse Electric (TE1) polarization mode comprising a first arm mode in-phase and a second arm mode out-of-phase at the second middle cross-section plane;

a splitter waveguide in taper shape coupled to the second middle cross-section plane for separating the first arm mode and the second arm mode at a third middle cross-section plane with a spacing greater than 0.2 µm;

a first branch waveguide and a second branch waveguide coupled to the third middle cross-section plane for respectively transmitting the first arm mode and the second arm mode, the first branch waveguide being configured to deliver the first arm mode with a same phase, the second branch waveguide comprising a phase shifter to deliver the second arm mode with a phase 180° reversed; and a 2×1 Multimode Interference (MMI) coupler waveguide coupled to the first branch waveguide and the second branch waveguide to combine both the first arm mode and the second arm mode in phase to an output optical signal with TE polarization mode;

wherein the output optical signal comprises an optical power loss less than 1 dB relative to the input optical signal with any wavelength in entire C-band.

* * * * *